Patented July 3, 1945

2,379,453

UNITED STATES PATENT OFFICE 2,379,453

MINERAL OIL COMPOSITION

Thomas T. Noland, Woodbury, N. J., assignor to Socony-Vacuum Oil Company, Incorporated, New York, N. Y., a corporation of New York No Drawing. Application June 1, 1944, Serial No. 538,333

11 Claims. (Cl. 252—33)

This invention has to do with the stabilization of viscous mineral oil fractions against the deleterious effects of oxidation or deterioration with use by the addition thereto of oxidation-inhibitors. More specifically, the invention is directed to the improvement of viscous mineral oil fractions by a combination of such inhibitors: namely, a primary oxidation inhibitor and a secondary inhibitor which when admixed with a viscous mineral oil in minor proportions will prevent or delay certain other undesirable changes taking place in the oil.

As is well known to those familiar with the art, substantially all of the numerous fractions obtained from mineral oils and refined for their various uses are susceptible to oxidation. The susceptibility of an oil fraction to oxidation and the manner in which such oxidation manifests itself within the oil varies with the type and degree of refinement to which the oil has been subjected and with the conditions under which it is used or tested: that is, the products formed in an oil fraction as a result of oxidation and the degree to which they are formed depends upon the extent to which the various unstable constituents or constituents which may act as oxidation catalysts have been removed by refining operations and also upon the conditions of use to which the oil is put.

The present invention is predicated upon the discovery that the oxidation characteristics of viscous mineral oil fractions are greatly improved by the incorporation therein of minor proportions of each of two inhibitors which are designated herein as primary oxidation inhibitors and secondary inhibitors.

The primary oxidation inhibitors contemplated herein are phosphorus- and sulfur-containing reaction products obtained by reaction, at a temperature above about 100° C., of a phosphorus sulfide and a dicyclic terpene or a material predominantly comprised of a dicyclic terpene.

All of the phosphorus sulfides, such as $P_3S_8$ (or $PS_2$), $P_4S_6$ (or $P_2S_3$), $P_4S_3$, $P_2S_5$, $P_4S_7$, $P_4S_{10}$, etc., are contemplated as reactants in the preparation of primary oxidation inhibitors, but $P_2S_5$ is particularly preferred. As used herein, the designation "dicyclic terpene" refers to those terpenes which are characterized by the presence of one double bond in the molecule and are built up of two ring systems. Illustrative of such compounds are pinene, camphene and fenchene. Also contemplated as coming within this particular designation are those materials which are predominantly comprised of one or more dicyclic terpenes, representative of which materials are the essential or volatile oils, which are predominantly comprised of such a terpene or terpenes and are typified by turpentine oil, the major constituent of which is pinene. Particular preference is accorded to pinene and turpentine oil.

It is to be understood that the aforesaid designation, "dicyclic terpene," is not inclusive of such terpenes as those known in the art as monocyclic terpenes, which are typified by dipentene and terpinolene. It is also to be understood that the dicyclic terpenes should not be confused with the olefin hydrocarbon terpenes such as myrcene.

Although a complete understanding of the chemical composition of the reaction products of phosphorus sulfide and dicyclic terpenes has not been achieved at this time, a partial understanding of their composition may be obtained by noting the characteristics involved in the reaction. For example, the reaction of phosphorus pentasulfide and pinene commences at about 100° C. and is exothermic in nature. During the reaction, the reaction mixture increases appreciably in viscosity, and little, if any, hydrogen sulfide is evolved therefrom. The reaction product obtained contains phosphorus and sulfur in substantially the same amounts as in the particular phosphorus sulfide reacted with the pinene. It would therefore appear that the reaction is one of addition: that is, addition of phosphorus sulfide to the one unsaturated bond present in pinene.

Although the reaction temperature for the reaction described above should be one of at least about 100° C., the preferred temperatures fall within the range of about 100° C. to about 160° C.

The proportions of reagents used in the preparation of the primary oxidation inhibitors may be varied in order to prepare reaction products having different degrees of oil-solubility and different degrees of oil-improving power. In this regard, it is preferred that about one mol of phosphorus sulfide be reacted with four mols of a dicyclic terpene in order to obtain a reaction product relatively soluble in petroleum oils. For example, when more than one mol of $P_2S_5$ is used with four mols of pinene, a viscous gel-like reaction product is obtained, and this product is definitely insoluble in petroleum oils. When less than one mol of $P_2S_5$ is used with four mols of pinene, a viscous oil also somewhat insoluble in mineral oils is obtained, after the unreacted pinene has been removed by distillation. Accordingly, it is to be understood that although effective primary oxidation inhibitors can be obtained by using different ratios of reactants, particularly-preferred inhibitors are those obtained by using approximately one mol of a phosphorus sulfide for about four mols of a dicyclic terpene.

There is, however, still another desirable procedure for preparing the primary oxidation inhibitor. In order to obtain a relatively non-viscous reaction product, the dicyclic terpene, such as pinene, may be blended with a comparatively-inert solvent, such as petroleum oil, and then treated as described above to yield an oil blend of the reaction product. The preferred procedure of this latter type involves the use of a 1:1 blend of dicyclic terpene and petroleum oil with the phosphorus sulfide, the molar ratio of said terpene to said sulfide being about 4:1.

When used in viscous mineral oil fractions in small amounts, the aforesaid primary oxidation inhibitors effect improvement of several of the oxidation characteristics thereof by preventing, for example, corrosion of hard metal bearings, by inhibition of acid-formation, by inhibition of formation of gummy deposits in engines, by preventing increase in viscosity, etc. However, on standing for several days or when heated and then left to stand, an oil composition comprised only of a viscous mineral oil fraction and a primary oxidation inhibitor tends to become cloudy. This shortcoming has now been overcome by incorporating in such oil composition a small amount of a secondary inhibitor.

The secondary inhibitors of this invention which are capable of regulating or preventing the aforesaid haze problem are oil-miscible metal salts of sulfonic acids. These sulfonic acids include both those prepared from aromatic hydrocarbons, or substituted aromatic hydrocarbons, by treatment with strong sulfuric acid, oleum, chlorsulfonic acid, etc., and those obtained by treatment of various petroleum fractions with the same reagents. Any metallic salt of any organic sulfonic acid that is sufficiently soluble in petroleum oils is contemplated by this invention as the secondary inhibitor. Among the metals which are especially suitable for this purpose are sodium, potassium, magnesium, calcium, cobalt, tin, strontium and barium. Particularly preferred are barium, sodium and calcium.

Of the sulfonic acids contemplated by the present invention, preference is given to the substituted aromatic sulfonic acids and to the petroleum sulfonic acids. Both mono- and poly-substituted aromatic sulfonic acids are contemplated, particular preference being given to the alkyl-substituted benzene sulfonic acids. Of the mono- and poly-alkyl substituents for the aromatic sulfonic acids, the so-called "wax" substituents— that is, those alkyl substituents containing at least about 20 carbon atoms—are particularly preferred.

The particularly-preferred compositions of primary and secondary inhibitors in viscous mineral oil fractions which are contemplated herein are those in which the primary inhibitor is a $P_2S_5$- pinene reaction product or a $P_2S_5$-turpentine oil reaction product and the secondary inhibitor is either barium or calcium diwax-benzene sulfonate, barium or calcium petroleum sulfonate, or sodium petroleum sulfonate.

The following examples describe the preparation of several inhibitors typical of the primary oxidation inhibitors contemplated herein:

Example I

Two hundred grams (1.47 mol) of pinene and 41 grams (0.185 mol) of $P_2S_5$ were warmed together with stirring for 1 hour with rising temperature, the maximum temperature being 160° C. There was practically no evolution of hydrogen sulfide during the reaction, and the reaction mixture was a dark-orange, viscous oil. On distillation at 5 mms. pressure and maximum temperature of 150° C., 70 grams (0.51 mol) of pinene were recovered. The residual oil was analyzed and found to contain 16.7 per cent sulfur and 6.0 per cent phosphorus. This product will be referred to hereinafter as product I.

Example II

A blend of 100 grams of pinene and 100 grams of a motor oil (Saybolt Universal viscosity (S. U. V.) of 45 seconds at 210° F.) was heated with 41 grams of $P_2S_5$, the molar ratio of pinene to $P_2S_5$ being 4:1. An exothermic reaction took place with the temperature rising to a maximum of 190° C. for a few minutes. The reaction mixture was filtered after it had been cooled, several grams of clay having been added to facilitate the filtration. The filtrate was a viscous oil containing 11.7 per cent sulfur and 4.78 per cent phosphorus. This product is identified hereinafter as product II.

Example III

Eight hundred grams of pinene and 800 grams of a motor oil (Saybolt Universal viscosity (S. U. V.) of 45 seconds at 210° F.) were heated to 105° C. with stirring. 326.4 grams of $P_2S_5$ (a ratio of 4 mols of pinene to 1 mol of $P_2S_5$) were added slowly, the temperature rising to 115° C. because of the exothermic reaction. The mixture was then heated to 150° C. for 1 hour, 32 grams of clay were added, and the resultant mixture filtered. The filtrate weighed 1842 grams and was then distilled to 150° C. at 5 mms. pressure. In this way 149 grams of unreacted pinene were recovered. The remaining product, 1693 grams, was a clear, viscous oil containing 12.5 per cent sulfur and 5.1 per cent phosphorus. This product is referred to hereinafter as product III.

Example IV

The procedure described in Example III above was carried out with gum spirits of turpentine, or turpentine oil, used in place of pinene. The final product was similar to that obtained with pinene but was very slightly cloudy in appearance. It contained 11.8 per cent sulfur and 4.8 per cent phosphorus and is referred to hereinafter as product IV.

The reaction involved in the preparation of the reaction products contemplated herein and illustrated by the foregoing examples is novel inasmuch as it is characteristic of only some of the terpenes. As shown above, this reaction is characteristic of the dicyclic terpenes. It is not, however, characteristic of the monocyclic terpenes, nor is it operative for all aromatic compounds containing one or more unsaturated side-chains. For example, a very different reaction takes place between a phosphorus sulfide and a monocyclic terpene when the reaction conditions are those used in the preparation of the contemplated reaction products of dicyclic terpenes. This is illustrated by the reaction between $P_2S_5$ and dipentene, a typical monocyclic terpene characterized by two unsaturated bonds, described below in Example V.

*Example V*

One hundred grams of dipentene, 100 grams of petroleum oil and 41 grams of $P_2S_5$ were contacted as described in Example III above. A considerable evolution of hydrogen sulfide occurred throughout the reaction, and the walls of the reaction vessel were coated with an insoluble sludge. Only 76 per cent of the weight of the reactants was recovered, the product being a viscous, cloudy oil which did not give a clear 1 per cent solution in a petroleum oil. On analysis it was found to contain 6.8 per cent sulfur and 2.9 per cent phosphorus, an indication that an appreciable portion of the phosphorus and sulfur present in the $P_2S_5$ used was lost in the reaction. This loss was to insoluble sludge and gaseous products such as hydrogen sulfide.

The procedure shown in Example V was also followed with another typical monocyclic terpene, terpinolene, and the results were similar to those obtained with dipentene: that is, considerable hydrogen sulfide was evolved during the reaction; an insoluble sludge was formed; and there was a loss of phosphorus and sulfur.

That the reaction involved in the preparation of the dicyclic terpene-phosphorus sulfide reaction products contemplated herein is specific to the dicyclic terpenes is further evidenced by the fact that an olefinic hydrocarbon terpene, typified by myrcene, reacts with a phosphorus sulfide in a manner analogous to that of the monocyclic terpenes. Furthermore, terpene alcohols, such as terpineol, and terpene ketones, such as fenchone, reacted with phosphorus sulfides in the same manner as did the monocyclic terpenes, as typified by dipentene and terpinolene.

As stated above, oil compositions comprising only a viscous mineral oil fraction and a typical primary oxidation inhibitor have a tendency to develop a haze, the formation of which can be suppressed by the addition to such compositions of a small amount of a secondary inhibitor, namely, an oil-miscible metal salt of a sulfonic acid. This fact is demonstrated by the test results set forth in table below. The oil used in these tests was a solvent-refined S. A. E. 10 grade motor oil.

The phosphorus pentasulfide-pinene reaction product was prepared as described in Example III above.

The barium diwax benzene sulfonate used as the haze-inhibitor was prepared by reacting a 10 per cent chloro-paraffin wax with benzene to form a diwax benzene, which was treated with oleum to form the sulfonic acid, which in turn was neutralized with barium hydroxide. In order to reduce the viscosity and to increase the ease of handling, this product was blended in a 1:1 ratio with an S. A. E. 30 grade motor oil. The blend contained 5.17 per cent barium and 1.5 per cent sulfur.

The sodium petroleum sulfonate used in these tests was the sodium salt of an oil-soluble sulfonic acid prepared by treating a Midcontinent distillate of 95 seconds Saybolt Universal viscosity at 100° F. with oleum. It contained 2.57 per cent sulfur.

The barium petroleum sulfonate was prepared from the above sodium salt by treatment with $BaCl_2$ solution. It contained 6.9 per cent barium.

The various blends indicated in table were placed in 4-oz. bottles and kept at room temperature in diffused light for the length of time given below, with the following results:

*Table*

| Primary inhibitor | Conc., per cent | Secondary inhibitor | Conc., per cent | Appearance |
|---|---|---|---|---|
| Product III | 1 | | | Haze in 14 days. |
| Do | 0.9 | Barium diwax benzene sulfonate. | 0.1 | Clear at 21 days. |
| Do | 3 | | | Haze in 1 day. |
| Do | 2.7 | Barium diwax benzene sulfonate. | 0.3 | Clear at 14 days. |
| Do | 2.7 | Barium petroleum sulfonate. | 0.3 | Clear at 30 days. |
| Do | 2.7 | Sodium petroleum sulfonate. | 0.3 | Do. |

The results shown above in table demonstrate effectively that haze-formation in an oil containing as a primary oxidation inhibitor a pinene-$P_2S_5$ reaction product is appreciably inhibited by the addition of a small amount of the secondary inhibitor contemplated by this invention.

The amount of secondary inhibitor necessary to effect the desired haze-inhibition depends upon the concentration of primary oxidation inhibitor in the oil as well as upon the type of mineral oil fraction used. In general, however, from about 1.0 to about 10.0 per cent by weight of the secondary inhibitor based upon the amount of primary inhibitor present will be sufficient to effectively regulate haze-formation. The amount of primary oxidation inhibitor contemplated for use in the oil compositions of the present invention is from about 0.1 per cent to about 3.0 per cent, although about 0.1 per cent to about 1 per cent of these reaction products will usually suffice. Accordingly, the amount of secondary inhibitor used in the oil blend will be from about 0.001 per cent to about 0.3 per cent by weight.

As contemplated herein, the primary and secondary inhibitors of this invention may be incorporated in a viscous mineral oil fraction either by adding the secondary inhibitor to the primary inhibitor before both are blended with the oil or by adding the secondary inhibitor separately to the blend of the oil and the primary inhibitor. The term, "mineral oil composition," as used herein and as recited in all of the appended claims is inclusive of all mineral oil fractions containing a primary oxidation inhibitor and a secondary inhibitor and of all oil compositions obtained or prepared by any of the procedures hereinabove described. Any oil composition so obtained or prepared is substantially free of haze normally occurring in an oil composition containing the primary oxidation inhibitor alone.

It is also to be understood that the examples, procedures, and oil compositions described herein are illustrative only and are not to be construed as limiting the scope of this invention thereto. Thus, all dicyclic terpenes as broadly described above may be used in place of those shown in Examples I through IV; any phosphorus sulfide may be used in place of the preferred phosphorus pentasulfide used in the above examples; the mineral oils disclosed above are but typical of all viscous mineral oil fractions which may be used in this invention; and any metallic salt of any sulfonic acid that is sufficiently soluble in petroleum oils is suitable for use as the secondary inhibitor.

I claim:

1. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature greater than about 100° C., of a phosphorus sulfide and a material selected from the group consisting of a dicyclic terpene and an essential oil predominantly comprised of a dicyclic terpene, said reaction product normally tending to form a haze in the oil; and a minor proportion, from about 0.001 per cent to about 0.3 per cent, sufficient to suppress the formation of said haze, of an oil-miscible metal salt of a sulfonic acid.

2. A mineral oil composition comprising a viscous mineral oil fraction containing a minor proportion, from about 0.1 per cent to about 3.0 percent, sufficient to inhibit the deteriorating effects of oxidation upon the oil, of a phosphorus- and sulfur-containing reaction product obtained by reaction, at a temperature between about 100° C. and about 160° C., of a phosphorus sulfide and a material selected from the group consisting of a dicyclic terpene and an essential oil predominantly comprised of a dicyclic terpene, said reaction product normally tending to form a haze in the oil; and a minor proportion, from about 0.001 per cent to about 0.3 per cent, sufficient to suppress the formation of said haze, of an oil-miscible metal salt of a sulfonic acid.

3. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of a phosphorus sulfide and four mols of a material selected from the group consisting of a dicyclic terpene and an essential oil predominantly comprised of a dicyclic terpene, said reaction product normally tending to form a haze in the oil; and a minor proportion, from about 0.001 per cent to about 0.3 per cent, sufficient to suppress the formation of said haze, of an oil-miscible metal salt of a sulfonic acid.

4. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of a material selected from the group consisting of a dicyclic terpene and an essential oil predominantly comprised of a dicyclic terpene, said reaction product normally tending to form a haze in the oil; and a minor proportion, from about 0.001 per cent to about 0.3 per cent, sufficient to suppress the formation of said haze, of an oil-miscible metal salt of a sulfonic acid.

5. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible metal salt of a sulfonic acid.

6. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of turpentine oil, said reaction product normally tending to form a haze in the oil; and a minor proportion, from about 0.001 per cent to about 0.3 per cent, sufficient to suppress the formation of said haze, of an oil-miscible metal salt of a sulfonic acid.

7. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible metal salt of an alkyl-substituted aromatic sulfonic acid.

8. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible metal salt of an alkyl-substituted benzene sulfonic acid.

9. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible metal salt of a wax-substituted benzene sulfonic acid.

10. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C.

and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible barium salt of diwax-substituted benzene sulfonic acid.

11. A mineral oil composition comprising a viscous mineral oil fraction containing a minor proportion, from about 0.1 per cent to about 3.0 per cent, sufficient to inhibit the deteriorating effects of oxidation upon the oil, of a phosphorus- and sulfur-containing reaction product obtained by reaction, at a temperature between about 100° C. and about 160° C., of substantially one mol of phosphorus pentasulfide and four mols of pinene, said reaction product normally tending to form a haze in the oil; and a minor proportion, from about 0.001 per cent to about 0.3 per cent, sufficient to suppress the formation of said haze, of an oil-miscible metal salt of a petroleum sulfonic acid.

THOMAS T. NOLAND.